US009298515B2

(12) United States Patent
McMurry et al.

(10) Patent No.: US 9,298,515 B2
(45) Date of Patent: Mar. 29, 2016

(54) METHODS, SYSTEMS, AND COMPUTER READABLE MEDIA FOR PROVIDING A VIRTUALIZED DIAMETER NETWORK ARCHITECTURE AND FOR ROUTING TRAFFIC TO DYNAMICALLY INSTANTIATED DIAMETER RESOURCE INSTANCES

(71) Applicant: Tekelec, Inc., Morrisville, NC (US)

(72) Inventors: Sam Eric McMurry, Richardson, TX (US); Apirux Bantukul, Cary, NC (US); Ajay Padmakar Deo, Carrollton, TX (US); Joanne Steinberg, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 185 days.

(21) Appl. No.: 14/182,800

(22) Filed: Feb. 18, 2014

(65) Prior Publication Data

US 2014/0237111 A1  Aug. 21, 2014

Related U.S. Application Data

(60) Provisional application No. 61/766,073, filed on Feb. 18, 2013.

(51) Int. Cl.
*G06F 15/16* (2006.01)
*G06F 9/50* (2006.01)
(Continued)

(52) U.S. Cl.
CPC .......... *G06F 9/5072* (2013.01); *H04L 41/0816* (2013.01); *H04L 67/1031* (2013.01); *H04L 67/306* (2013.01); *H04L 41/0893* (2013.01)

(58) Field of Classification Search
CPC ............ H04L 41/0816; H04L 67/1031; H04L 41/0893
See application file for complete search history.

(56) References Cited

U.S. PATENT DOCUMENTS 8,665,717 B2   3/2014  Kotecha et al.
8,879,431 B2 * 11/2014  Ridel ................... H04L 47/125
                                                        370/259

(Continued)

FOREIGN PATENT DOCUMENTS

KR   10-2009-0033968   4/2009
KR   10-2012-0055955   6/2012

(Continued)

OTHER PUBLICATIONS

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

(Continued)

*Primary Examiner* — Moustafa M Meky
(74) *Attorney, Agent, or Firm* — Jenkins, Wilson, Taylor & Hunt, P.A.

(57) ABSTRACT

The subject matter described herein includes methods, systems, and computer readable media for providing virtualized Diameter network architecture and for routing traffic to dynamically instantiated Diameter resource instances. A system for providing virtualized Diameter resources and for routing traffic to dynamically instantiated Diameter resource instances includes a cloud virtualizer for virtualizing a hardware pool and for supporting dynamically instantiated Diameter resource instances. The system further includes a cloud orchestrator for monitoring network and hardware events and for instructing the cloud virtualizer to instantiate Diameter resource instances or to reallocate hardware from the hardware pool among instantiated Diameter resource instances in response to the network or hardware conditions. The system further includes a cloud flow manager for dynamically configuring at least one network element for routing traffic to the dynamically instantiated Diameter resource instances or the allocated hardware.

20 Claims, 8 Drawing Sheets

(51) Int. Cl.
    H04L 29/08    (2006.01)
    H04L 12/24    (2006.01)

(56) References Cited

U.S. PATENT DOCUMENTS

| | | | |
|---|---|---|---|
| 2002/0091810 A1* | 7/2002 | Hundscheidt | H04L 12/5695 709/223 |
| 2009/0232011 A1 | 9/2009 | Li et al. | |
| 2009/0327079 A1* | 12/2009 | Parker | G06Q 30/02 705/14.55 |
| 2010/0080172 A1 | 4/2010 | Jin et al. | |
| 2010/0103861 A1 | 4/2010 | Ulupinar et al. | |
| 2010/0125477 A1 | 5/2010 | Mousseau et al. | |
| 2010/0211956 A1 | 8/2010 | Gopisetty et al. | |
| 2011/0131332 A1 | 6/2011 | Bouazizi | |
| 2011/0202676 A1 | 8/2011 | Craig et al. | |
| 2012/0123870 A1 | 5/2012 | Denman et al. | |
| 2012/0140665 A1 | 6/2012 | Li et al. | |
| 2012/0300615 A1 | 11/2012 | Kempf et al. | |
| 2012/0303835 A1 | 11/2012 | Kempf et al. | |
| 2013/0003745 A1 | 1/2013 | Nishimura | |
| 2013/0044645 A1 | 2/2013 | Castro Castro et al. | |
| 2013/0064093 A1* | 3/2013 | Ridel | H04L 47/125 370/236 |
| 2013/0086279 A1 | 4/2013 | Archer et al. | |
| 2013/0124712 A1 | 5/2013 | Parker | |
| 2013/0250770 A1 | 9/2013 | Zou et al. | |
| 2013/0343295 A1 | 12/2013 | Deo | |
| 2014/0026231 A1 | 1/2014 | Barak et al. | |
| 2014/0059678 A1 | 2/2014 | Parker | |
| 2014/0105140 A1* | 4/2014 | Guo | H04W 16/14 370/329 |
| 2014/0172739 A1* | 6/2014 | Anderson | G06Q 10/0836 705/338 |
| 2014/0189137 A1 | 7/2014 | Castro Castro et al. | |
| 2014/0204796 A1 | 7/2014 | Bantukul | |
| 2014/0233389 A1 | 8/2014 | Bantukul et al. | |
| 2014/0304416 A1* | 10/2014 | Khasnabish | H04L 67/16 709/226 |
| 2014/0348068 A1 | 11/2014 | Morper et al. | |
| 2015/0085663 A1 | 3/2015 | McMurry et al. | |
| 2015/0142940 A1 | 5/2015 | McMurry et al. | |
| 2015/0149656 A1 | 5/2015 | McMurry et al. | |

FOREIGN PATENT DOCUMENTS

| | | |
|---|---|---|
| KR | 10-2012-0059542 | 6/2012 |
| WO | WO 2009/070179 A1 | 6/2009 |
| WO | WO 2012/055446 A1 | 5/2012 |
| WO | WO 2012/063106 A1 | 5/2012 |
| WO | WO 2012/100092 A2 | 7/2012 |
| WO | WO 2012/149954 A1 | 11/2012 |
| WO | WO 2012/160465 A1 | 11/2012 |
| WO | WO 2013/188665 A1 | 12/2013 |
| WO | WO 2014/127346 A1 | 8/2014 |
| WO | WO 2014/127347 A1 | 8/2014 |
| WO | WO 2015/041750 A1 | 3/2015 |
| WO | WO 2015/077377 A1 | 5/2015 |
| WO | WO 2015/080906 A1 | 6/2015 |

OTHER PUBLICATIONS

Commonly-assigned, co-pending International Application No. PCT/US14/66469 for "Methods, Systems, and Computer Readable Media for a Network Function Virtualization Information Concentrator," (Unpublished, filed Nov. 19, 2014).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Non-Final Office Action for U.S. Appl. No. 13/749,655 (Sep. 3, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Notification of Transmittal of the International Search Report and the Written Opinion of the International Searching Authority, or the Declaration for International Application No. PCT/US2014/016853 (Jun. 6, 2014).

Notification of Transmittal of the International Search Report and the Written Opinion of the International Searching Authority, or the Declaration for International Application No. PCT/US2014/016860 (Jun. 4, 2014).

Notification of Transmittal of the International Search Report and the Written Opinion of the International Searching Authority, or the Declaration for International Application No. PCT/US2014/011551 (Apr. 28, 2014).

Commonly-assigned, co-pending U.S. Appl. No. 14/166,790 for "Methods, Systems, and Computer Readable Media for a Cloud-Based Virtualization Orchestrator," filed Jan. 28, 2014, Unpublished.

Commonly-assigned, co-pending U.S. Appl. No. 14/086,950 for "Methods, Systems, and Computer Readable Media for a Network Function Virtualization Information Concentrator," filed Nov. 21, 2013, Unpublished.

Commonly-assigned, co-pending U.S. Appl. No. 14/034,478 for "Methods, Systems, and Computer Readable Media for Diameter Load and Overload Information and Virtualization," filed Sep. 23, 2014, Unpublished.

Notification of Transmittal of the International Search Report and the Written Opinion of the International Searching Authority, or the Declaration for International Application No. PCT/US2013/045652 (Sep. 17, 2013).

Tschofenig, "Diameter Overload Architecture and Information Model," draft-tschofenig-dime-overload-arch-00.txt, DIME, pp. 1-9 (Jul. 16, 2013).

"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).

Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).

"3rd Generation Partnership Project; Technical Specification Group Services and System Aspects; Policy and charging control architecture (Release 11)," 3GPP TS 23.203, V11.8.0 pp. 1-179 (Dec. 2012).

Fajardo et al., "Diameter Base Protocol," RFC 6733, pp. 1-152 (Oct. 2012).

"Software-Defined Networking: The New Norm for Networks," ONF White Paper, Open Networking Foundation, pp. 1-12 (Apr. 13, 2012).

"OpenFlow Switch Specification," Version 1.1.0 Implemented (Wire Protocol 0x02), www.openflow.org, pp. 1-56 (Feb. 28, 2011).

Chapman et al., "Software architecture definition for on-demand cloud provisioning," Cluster Computing, vol. 15, No. 2, pp. 79-100 Feb. 27, 2011).

3rd Generation Partnership Project, "Technical Specification Group Services and System Aspects; Policy and charging control architecture (Release 9)," 3GPP TS 23.203 V9.3.0 (Dec. 2009).

Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).

"Introduction to Evolved Packet Core," White Paper, Alcatel-Lucent, 11 pgs. (2009).

Notification of Transmittal of the International Search Report and the Written Opinion of the International Searching Authority, or the Declaration for International Application No. PCT/US2014/066240 (May 13, 2015).

Final Office Action for U.S. Appl. No. 13/749,655 (Apr. 3, 2015).

(56) References Cited

OTHER PUBLICATIONS

Notification of Transmittal of the International Search Report and the Written Opinion of the International Searching Authority, or the Declaration for PCT International Application No. PCT/US2015/012250 (Mar. 31, 2015).

Communication of European Publication Number and Information on the Application of Article 67(3) EPC for European Application No. 13804779.0 (Mar. 25, 2015).

Non-Final Office Action for U.S. Appl. No. 14/034,478 (Mar. 23, 2015).

Non-Final Office Action for U.S. Appl. No. 13/917,200 (Mar. 16, 2015).

Notification of Transmittal of the International Search Report and the Written Opinion of the International Searching Authority, or the Declaration for International Application No. PCT/US2014/066469 (Feb. 20, 2015).

"Network Function Virtualization (NFV) Management and Orchestration," ETSI, Group Specification, GS NFV-MAN 001 V0.0.11, pp. 1-74 (Oct. 18, 2013).

"Split Architecture for Large Scale Wide Area Networks," SPARC ICT-258457 Deliverable D3.3, pp. 1-129 (Dec. 1, 2011).

\* cited by examiner

METHODS, SYSTEMS, AND COMPUTER READABLE MEDIA FOR PROVIDING A VIRTUALIZED DIAMETER NETWORK ARCHITECTURE AND FOR ROUTING TRAFFIC TO DYNAMICALLY INSTANTIATED DIAMETER RESOURCE INSTANCES

PRIORITY CLAIM

This application claims the benefit of U.S. Provisional Patent Application Ser. No. 61/766,073, filed Feb. 18, 2013, the disclosure of which is incorporated herein by reference in its entirety.

TECHNICAL FIELD

The subject matter described herein relates to Diameter network virtualization and for routing messages to dynamically-instantiated network resource instances. More particularly, the subject matter described herein includes methods, systems, and computer readable media for providing a virtualized Diameter network architecture and for routing traffic to dynamically-instantiated Diameter resource instances.

BACKGROUND

In current telecommunications network architectures, networks are engineered or statically provisioned for maximum capacity during peak hours. During off-peak hours, equipment is often idle. Accordingly, network resources are wasted, resulting in unnecessary capital expenditures by the network operators.

Virtualization in networks has been proposed in some contexts. However, once a virtual network element is instantiated, there is no standard mechanism for routing traffic to the newly-instantiated element. In addition, because Diameter networks are only beginning to be widely adopted, virtualization has not been fully explored in such networks. Accordingly, there exists a need for methods, systems, and computer readable media for methods, systems, and computer readable media for providing a virtualized Diameter network architecture and for routing traffic to dynamically-instantiated Diameter resource instances.

SUMMARY

The subject matter described herein includes methods, systems, and computer readable media for providing virtualized Diameter network architecture and for routing traffic to dynamically instantiated Diameter resource instances. A system for providing virtualized Diameter resources and for routing traffic to dynamically instantiated Diameter resource instances includes a cloud virtualizer for virtualizing a hardware pool and for supporting dynamically instantiated Diameter resource instances. The system further includes a cloud orchestrator for monitoring network and hardware events and for instructing the cloud virtualizer to instantiate Diameter resource instances or to reallocate hardware from the hardware pool among instantiated Diameter resource instances in response to the network or hardware conditions. The system further includes a cloud flow manager for dynamically configuring at least one network element for routing traffic to dynamically-instantiated Diameter resource instances or to the allocated hardware.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

As Diameter networks continue to evolve, Diameter network elements will move to the cloud, representing a virtual resource that can be used as needed by network operators. This represents a fundamental shift in the way network operators improve network scalability and flexibility. With a cloud based Diameter network, operators can leverage virtualization and software designed network technologies to deliver dynamic and elastic scalability in terms of sessions, transactions, and throughput. Such virtualization can be accomplished using standard hardware supported by a virtualization middleware layer or hypervisor. Virtualizing Diameter network resources enables flexible network screens for different types of services. Such virtualization also helps produce capital and operational expenditures by creating a more flexible architecture and deployment options. For example, operators no longer need to build excess core capacity to address peak hours, as virtual Diameter network resources can be temporarily moved to different locations based on changing traffic levels. Rather than statically provisioning network elements based on peak network utilization, the subject matter described herein includes a virtualized network architecture where Diameter signaling router (DSR), policy and charging rules function (PCRF), and subscriber profile repository (SPR) resource instances are dynamically instantiated on demand and where traffic is automatically routed to dynamically-instantiated resource instances.

Figure 1:
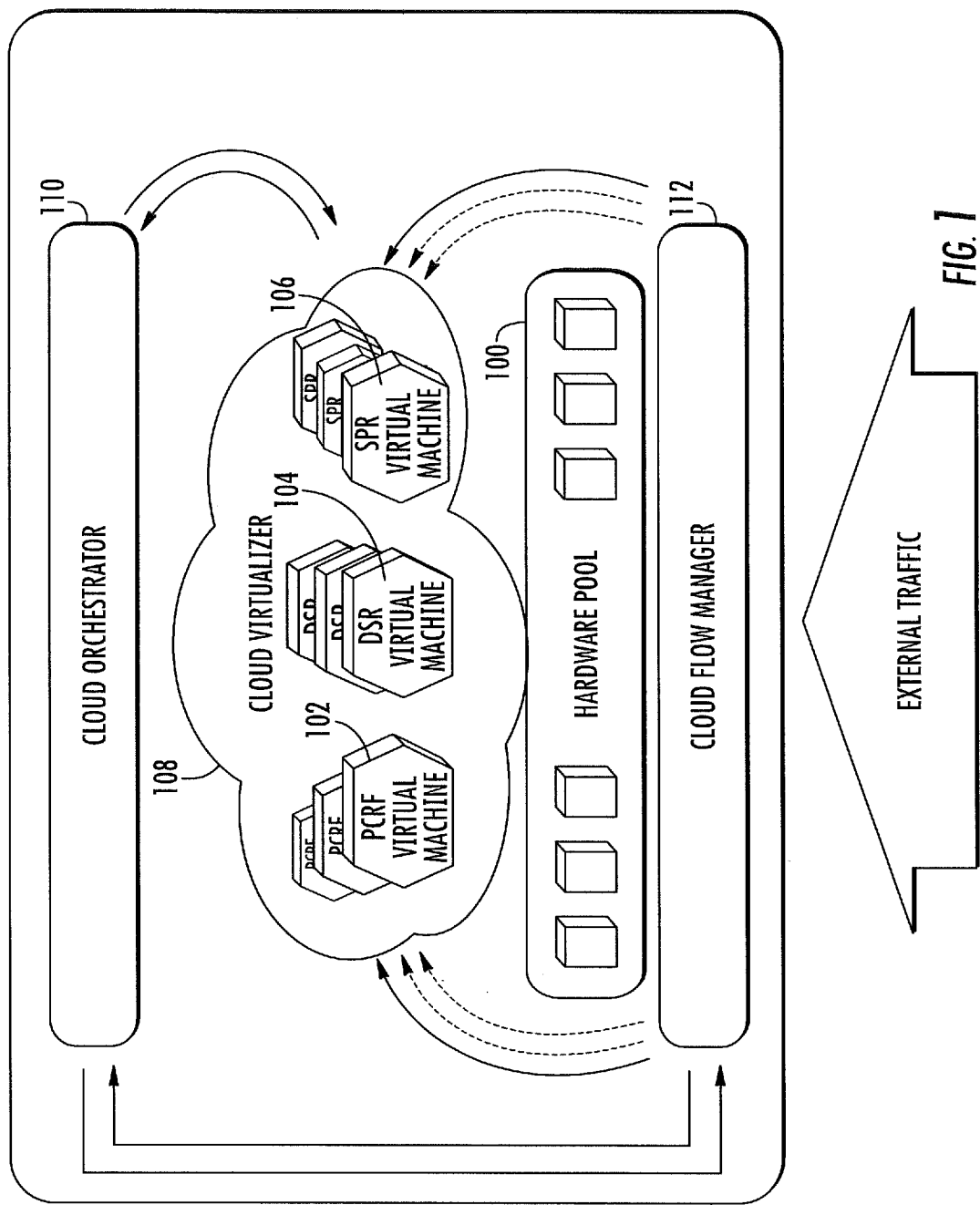
FIG. 1 is a block diagram of a virtualized Diameter network architecture according to an embodiment of the subject matter described herein.

FIG. 1 is a block diagram of a virtualized Diameter network architecture according to an embodiment of the subject matter described herein. Referring to FIG. 1, the network architecture includes a hardware pool 100 on which Diameter resource instances, some of which may be dynamically instantiated, execute. In the illustrated example, the Diameter resource instances include PCRF resource instances 102, DSR resource instances 104, and SPR resource instance 106. Hardware pool 100 may include computing platforms, such as server platforms or processor blades capable of supporting one or more Diameter resource instances. Each processor blade may include a microprocessor and associated memory.

Because hardware is not always standardized, and because it may be necessary to dynamically allocate new hardware using a standard interface, a cloud virtualizer 108 is provided. Cloud virtualizer 108 uses virtualization technology, such as virtual machine technology, to dynamically allocate or reallocate hardware resources from hardware pool 100 and to instantiate needed DSR, PCRF, or SPR resource instances on that hardware. A cloud orchestrator 110 monitors network and hardware events and instructs virtualizer 108 to dynamically allocate needed hardware resources and to dynamically instantiate DSR, PCRF, and SPR resource instances. For example, if cloud orchestrator 110 determines that the load on a DSR at a particular location recedes and there is a surge in the need for PCRF resources, orchestrator 110 may reallocate processor blades from hardware pool 100 that are currently allocated to the DSR resource instance whose load has receded to additional PCRF resource instances. This can be done with stateful binding to maintain sessions and context for newly-instantiated resources. In another example, if the load on PCRF resource instances recedes and the load on DSR resource instances increases, hardware may be reallocated from the PCRF resource instance whose load has receded to the DSR resource instances in need of additional processing power. In yet another example, hardware assigned to SPR resource instances whose load has receded may be reassigned to DSR resource instances whose load has increased. In yet another example, hardware assigned to DSR resource instances whose load has receded may be reassigned to SPR resource instances whose load has increased. In still another example, hardware assigned to PCRF resource instances whose load has receded may be assigned to SPR resource instances whose load has increased. In still another example, hardware assigned to SPR resource instances whose load has receded may be assigned to PCRF resource instances whose load has increased. Any reallocation or reassignment of hardware among Diameter resource instances in response to network or hardware conditions is intended to be within the scope of the subject matter described herein.

Once newly-instantiated resources are created, a cloud flow manager 112 dynamically routes traffic to the newly-instantiated virtual resources. For example, cloud flow manager 112 may use software-defined network technologies, such as OpenFlow, to dynamically manipulate traffic flows entering or leaving the network. In one example, when a network with one active DSR resource instances experiences a signaling traffic surge, additional processor blades with DSR resources can be added to manage the traffic. In one embodiment, cloud virtualizer 108 may implement a hypervisor layer that allows dynamic allocation and deallocation of hardware from hardware pool 100 to and from Diameter network resource instances, such as PCRF resource instances 102, DSR resource instances 104, and SPR resource instances 106.

Cloud orchestrator 110 instructs flow manager 112 to direct signaling flows to the newly-instantiated Diameter resource instances in the cloud. Flow manager 112 issues SDN commands, such as OpenFlow commands, to network routers to route messages to the newly-instantiated resources or to hardware that is newly allocated to existing resources. The OpenFlow protocol is described in the OpenFlow Switch Specification, Version 1.1.0, Feb. 28, 2011, the disclosure of which is incorporated herein by reference in its entirety.

Figure 2:
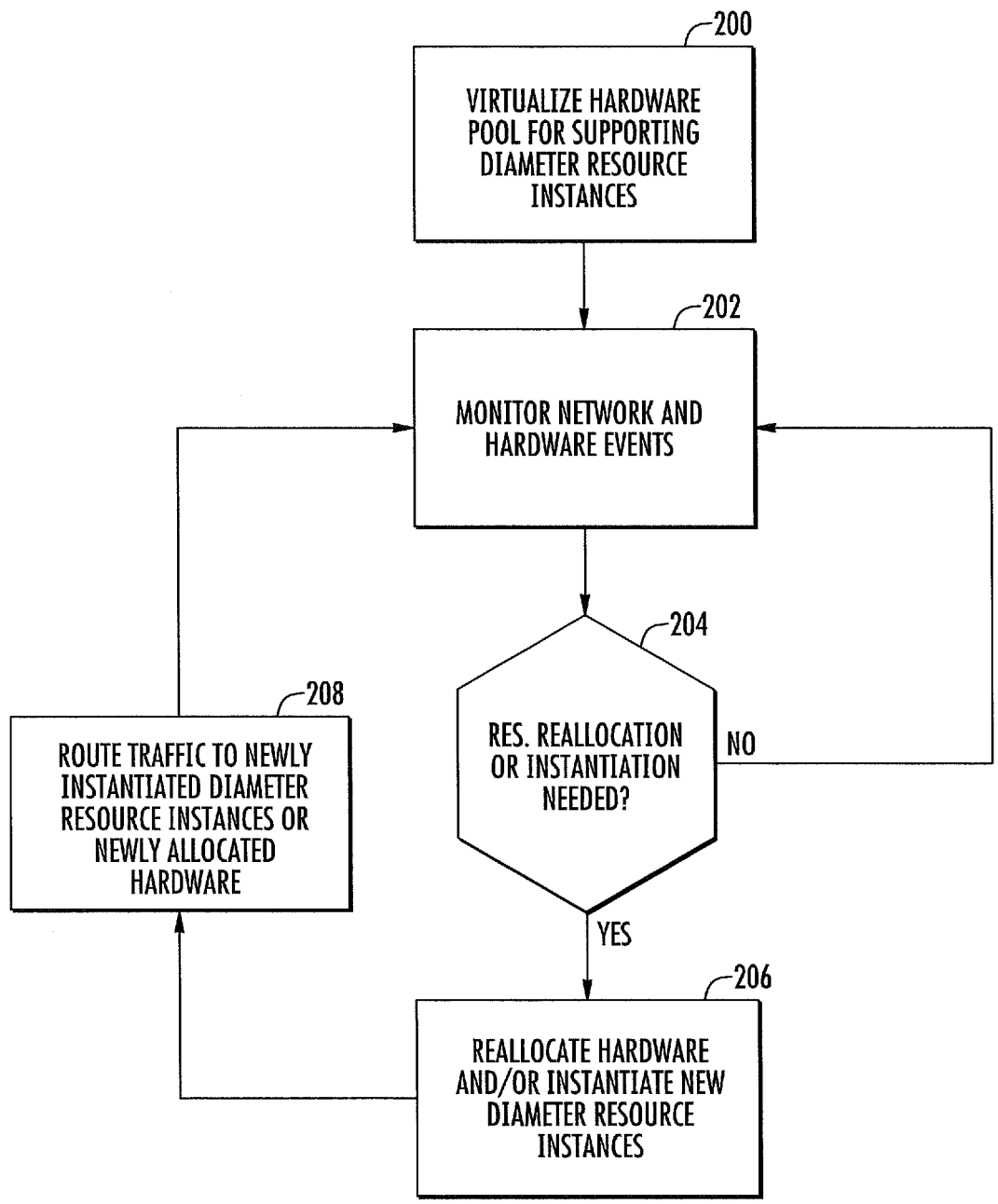
FIG. 2 is a flow chart illustrating an exemplary process for providing a virtualized Diameter network architecture and for routing traffic to dynamically-instantiated Diameter network instances according to an embodiment of the subject matter described herein.

FIG. 2 is a flow chart illustrating exemplary overall steps for providing a virtualized Diameter network architecture and for routing traffic to dynamically-instantiated Diameter resource instances. Referring to FIG. 2, in step 200, a hardware pool for supporting dynamically instantiated Diameter resource instances is provided. For example, hardware pool 100, which supports DSR, PCRF, and SPR virtual machines, may be virtualized. In step 202, network and hardware events are monitored. For example, cloud orchestrator 110 may receive input from network monitoring devices and from hardware pool 100 of network and hardware load conditions. In step 204, it is determined whether hardware resource reallocation or new Diameter resource instances are needed based on the monitored network or hardware events. If a resource reallocation or a Diameter resource instance instantiation is needed, control proceeds to step 206 where hardware resources are reallocated or where Diameter resource instances are instantiated. For example, additional processor blades may be allocated to support new or existing DSR, PCRF, or SPR resource instances. In another example, hardware resources associated with idle Diameter resource instances may be reallocated to other Diameter resource instances. In step 208, external traffic is routed to the newly instantiated Diameter network instances or newly allocated hardware. Step 208 may include issuing SDN commands, such as OpenFlow commands, to network routers to route traffic to newly-instantiated DSR, PCRF, or SPR resource instances or to hardware that has been assigned to new or existing Diameter resource instances.

Figure 3A:
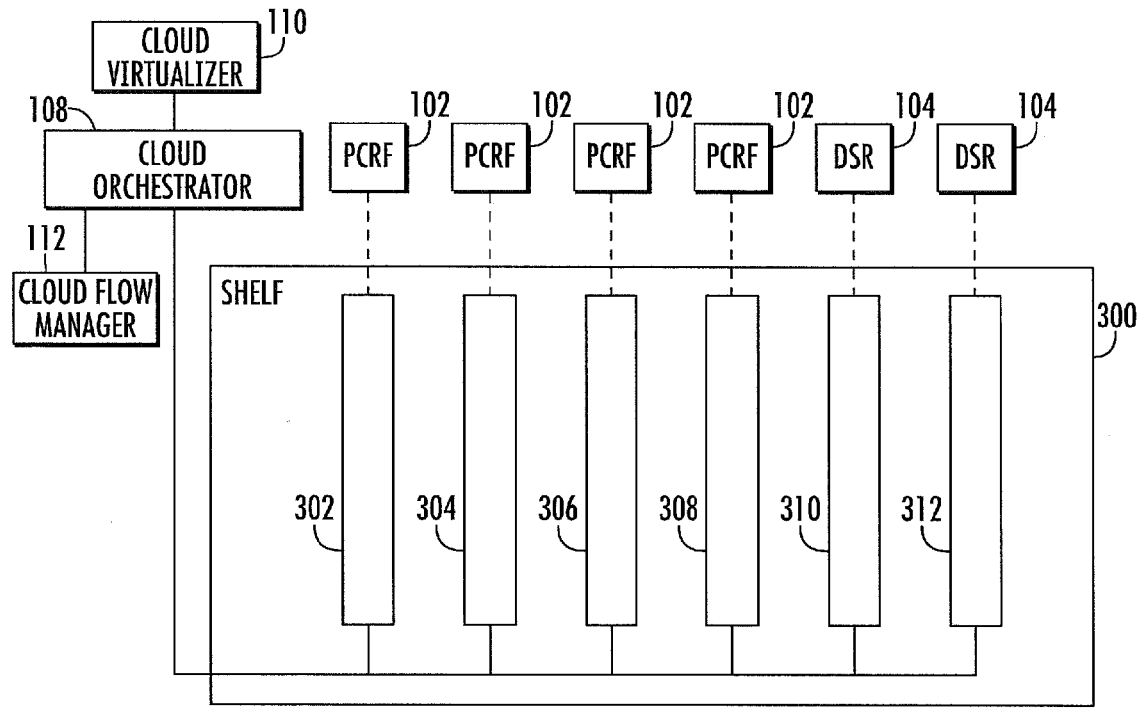
FIGS. 3A and 3B are block diagrams illustrating the dynamic reallocation of hardware from policy and charging rules function (PCRF) resource instances to Diameter signaling router (DSR) resource instances according to an embodiment of the subject matter described herein.
Figure 3B:
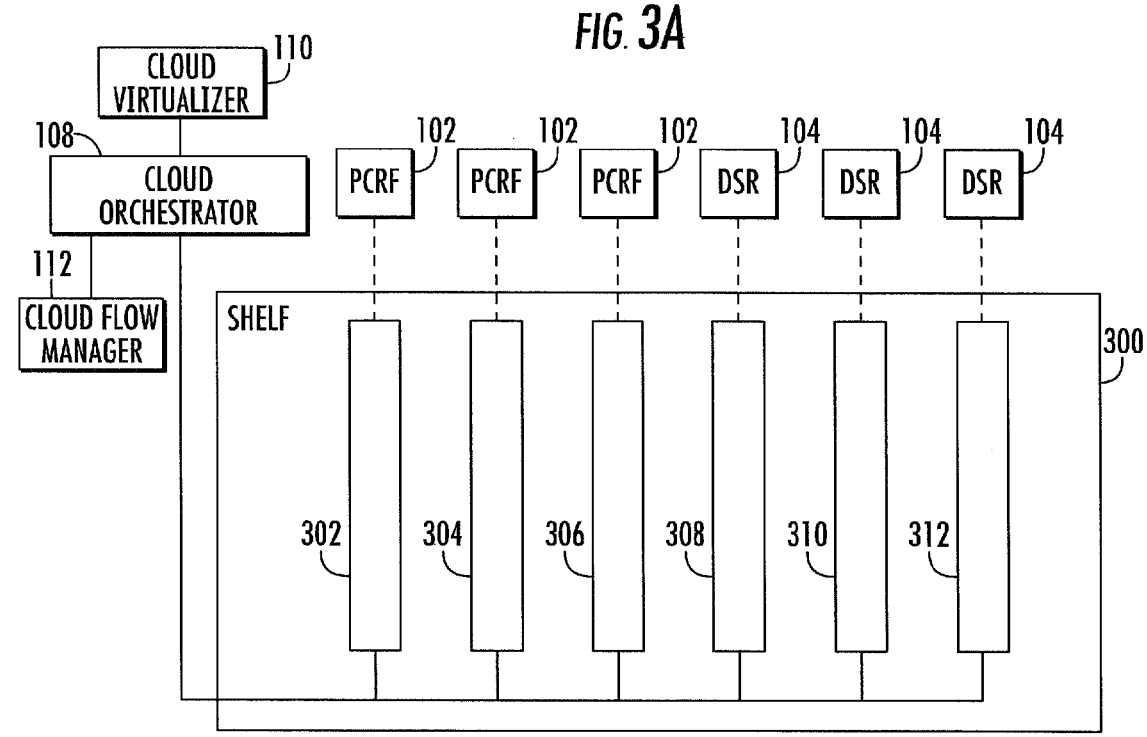

As stated above, cloud orchestrator 110 and cloud virtualizer 108 may communicate to reallocate hardware to Diameter resource instances of different types in response to network or hardware conditions. In one example, cloud orchestrator 110 may instruct cloud virtualizer 108 to allocate hardware previously allocated to PCRF resource instances to one or more DSR resource instances. FIGS. 3A and 3B illustrate this example. In FIG. 3A, a shelf 300 includes a plurality of processor blades 302, 304, 306, 308, 310, and 312. Each processor blade 302, 304, 306, 308, 310, and 312 may include a microprocessor, memory, disk storage, and network communications capabilities for supporting Diameter resource instances. In the illustrated example, processor blades 302, 304, 306, and 308 are currently allocated to PCRF resource instances 102 and processor blades 310 and 312 are allocated to DSR resource instances 104. When cloud orchestrator 110 receives notification that the processor blades supporting DSRs 104 are overloaded and the processor blades supporting PCRFs 102 have additional capacity, cloud orchestrator 110 may instruct cloud virtualizer 108 to allocate one or more processor blades previously allocated to PCRF resource instances to a DSR resource instance. FIG. 3B illustrates the state of the system from FIG. 3A after such reallocation. In FIG. 3B, processor blade 308 that was previously allocated to a PCRF resource instance 102 is now allocated to a DSR resource instance 104. Once the newly instantiated DSR resource instance 104 is running, cloud flow manager 112 may issue SDN commands to switches and routers to route Diameter signaling traffic to the newly instantiated DSR resource instance. In addition, cloud flow manager 112 may instruct switches and routers to route PCRF traffic previously directed to processor blade 306 to processor blades 302 and 304.

Figure 4A:
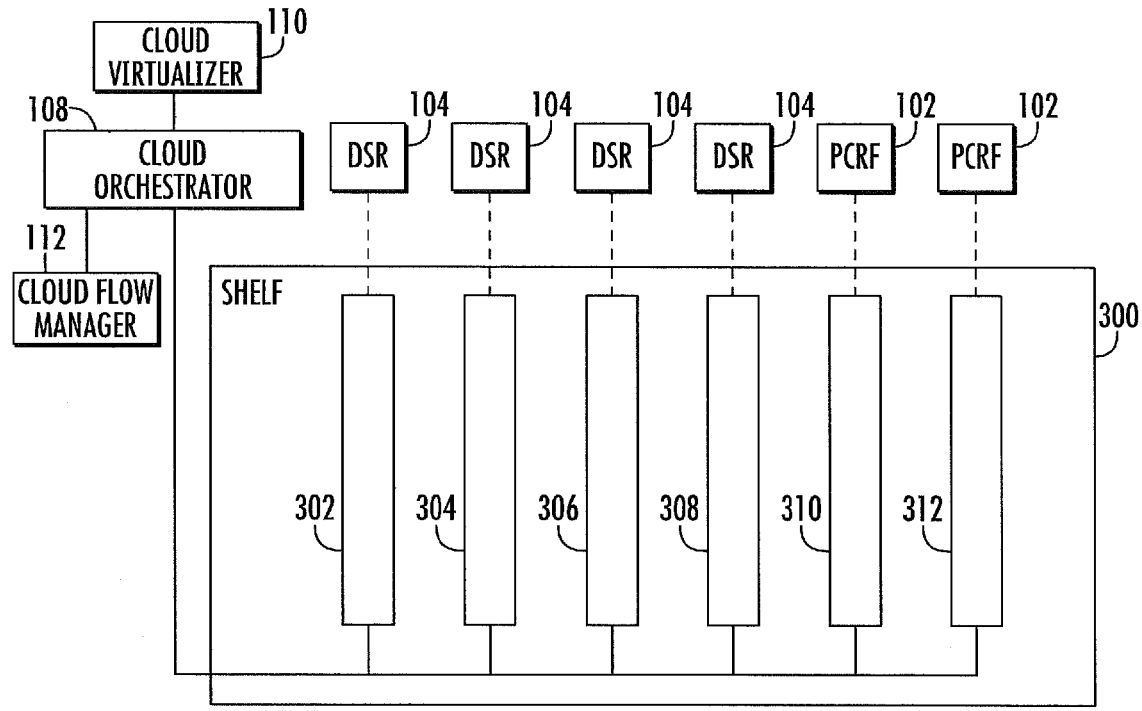
FIGS. 4A and 4B are block diagrams illustrating the dynamic reallocation of hardware from DSR resource instances to PCRF resource instances according to an embodiment of the subject matter described herein.
Figure 4B:
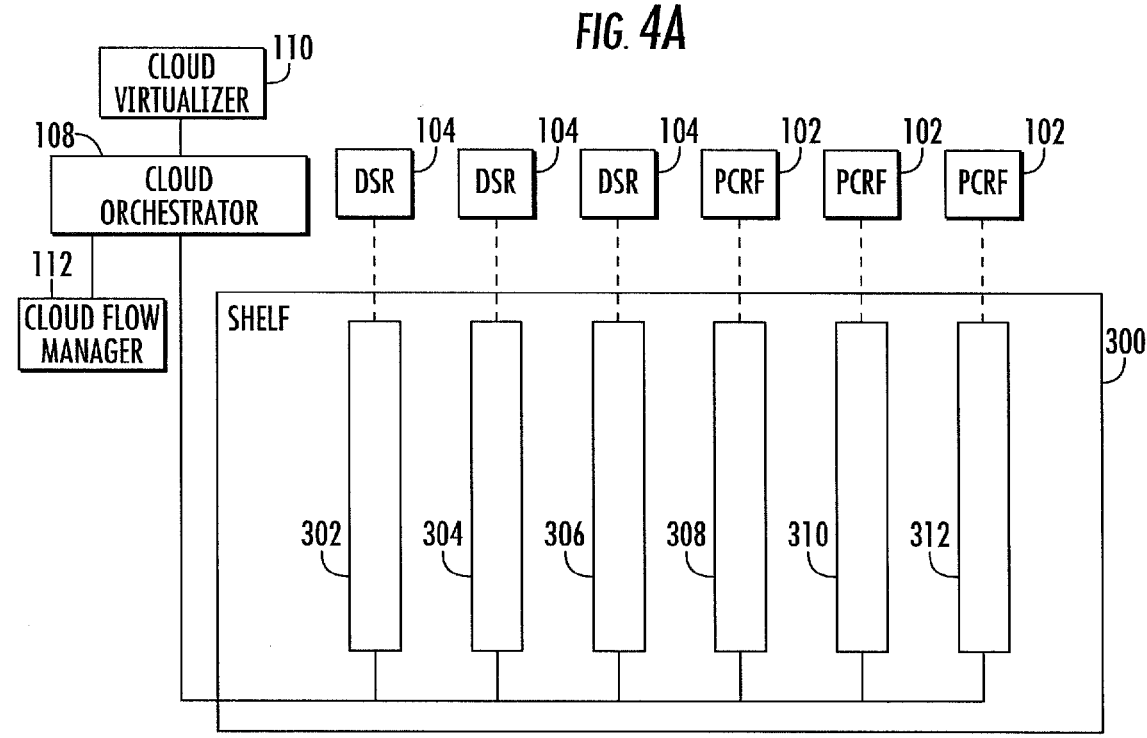

In another example, cloud orchestrator 110 may instruct cloud virtualizer 108 to allocate hardware previously allocated to a DSR resource instance to a PCRF resource instance. FIGS. 4A and 4B illustrate such an example. In FIG. 4A, processor blades 302, 304, 306, and 308 are allocated to DSR resource instances, and processor blades 310 and 312 are allocated to PCRF resources instances. Cloud orchestrator 110 receives notification that PCRF resource instances are overloaded. Accordingly, cloud orchestrator 110 instructs cloud virtualizer 108 to reallocate processor blade from a DSR resource instance to a PCRF resource instance. FIG. 4B illustrates the state of the system from FIG. 4A after such reallocation. In FIG. 4B, processor blades 302, 304, and 306 are allocated to PCRF resource instances, and processor blades 308, 310, and 312 are allocated to DSR resource instances. As with the previous example, once processor blade 308 is changed from a DSR resource instance 104 to a PCRF resource instance 102, cloud flow manager 112 may instruct switches and routers to route new PCRF traffic to processor blade 308 and to load share the DSR traffic among processor blades 302, 304, and 306.

Figure 5A:
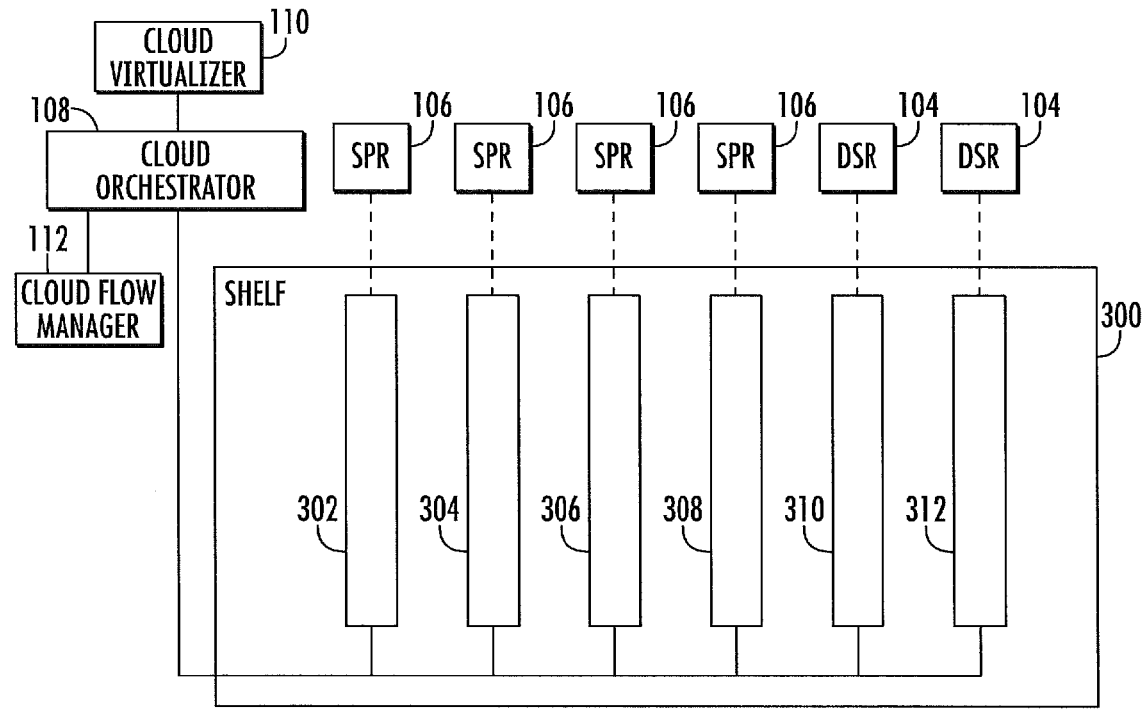
FIGS. 5A and 5B are block diagrams illustrating the dynamic reallocation of hardware assigned to subscriber profile repository (SPR) resource instances to DSR resource instances according to an embodiment of the subject matter described herein.
Figure 5B:
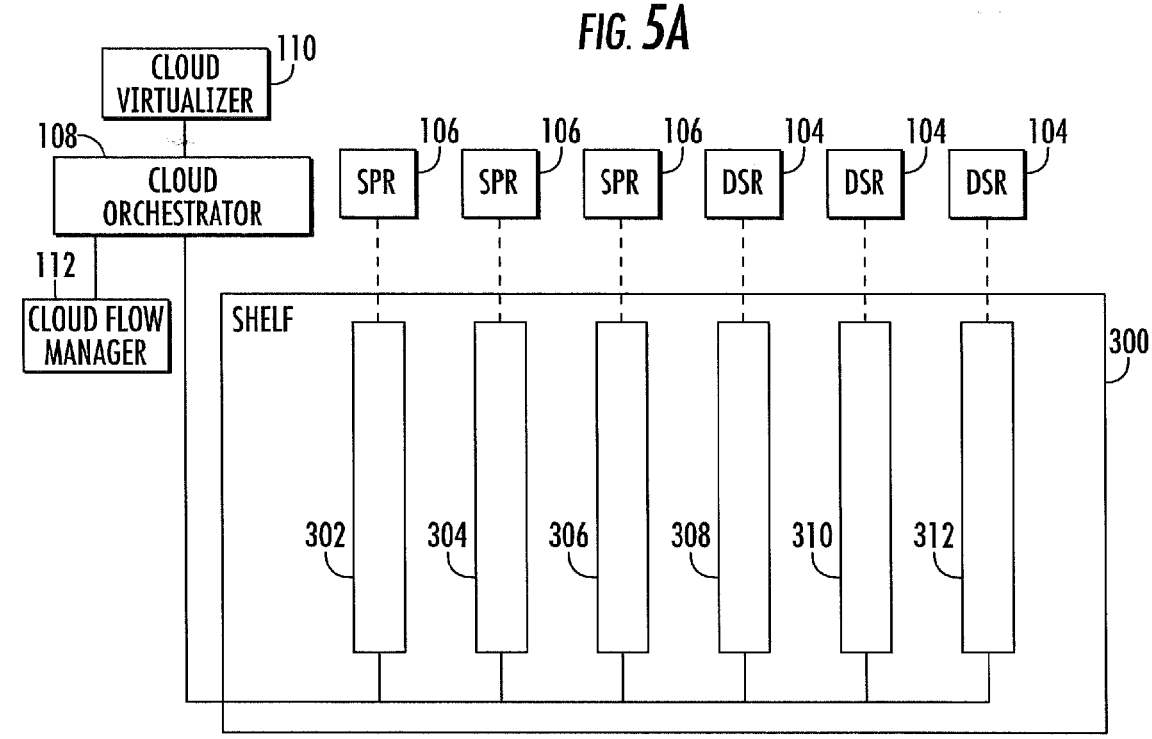

In yet another example, cloud orchestrator 110 may instruct cloud virtualizer 108 to allocate hardware previously allocated to SPR resource instances to DSR resource instances. FIGS. 5A and 5B illustrate such an example. In FIG. 5A, processor blades 302, 304, 306, and 308 are allocated to SPR resource instances 106. Processor blades 310 and 312 are allocated to DSR resource instances 104. When cloud orchestrator 110 determines that processor blades supporting DSR resource instances 104 are overloaded and that processor blades supporting resource instances 106 have available capacity, cloud orchestrator 110 may instruct cloud virtualizer 108 to reallocate processor blade 308 from SPR resource instance 106 to a DSR resource instance 104.

FIG. 5B illustrates the state of the system from FIG. 5A after reallocation. In FIG. 5B, processor blade 308 is allocated to a DSR resource instance 104, rather than an SPR resource instance 106. Once processor blade 308 is assigned to a DSR resource instance 104, cloud flow manager 112 may instruct switches and routers to route DSR traffic to processor blade 308 and to load share SPR traffic among processor blades 302, 304, and 306.

Figure 6A:
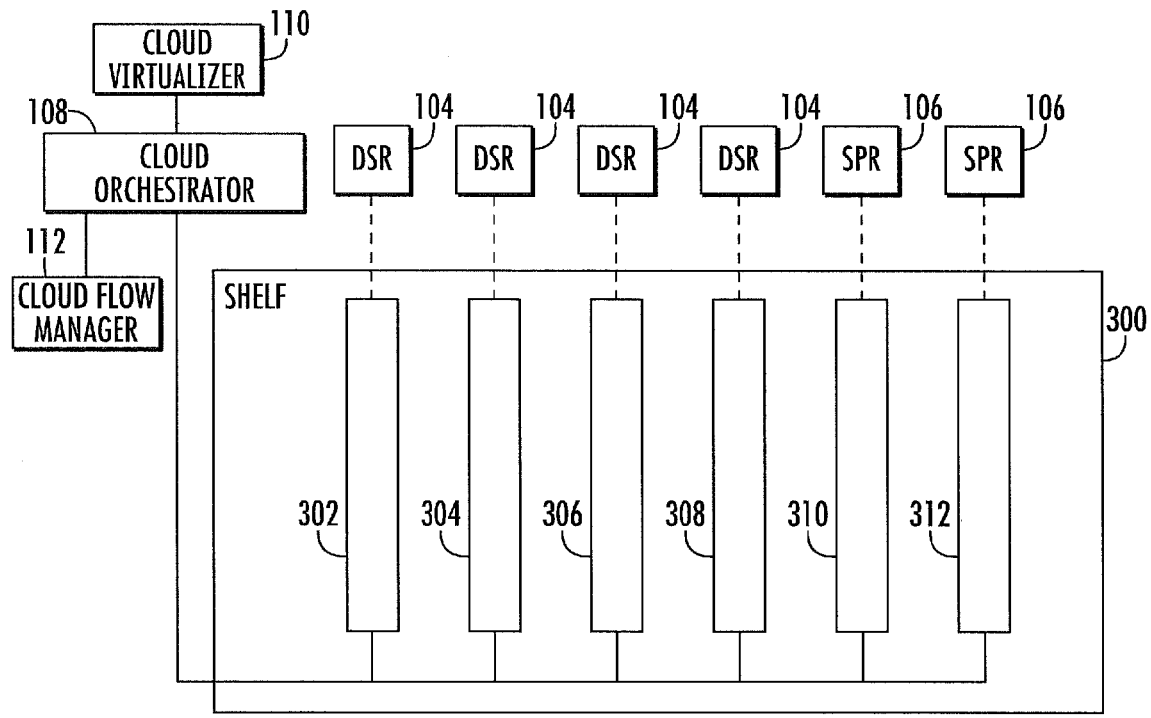
FIGS. 6A and 6B are block diagrams illustrating the dynamic reallocation of hardware from DSR resource instances to SPR resource instances according to an embodiment of the subject matter described herein.
Figure 6B:
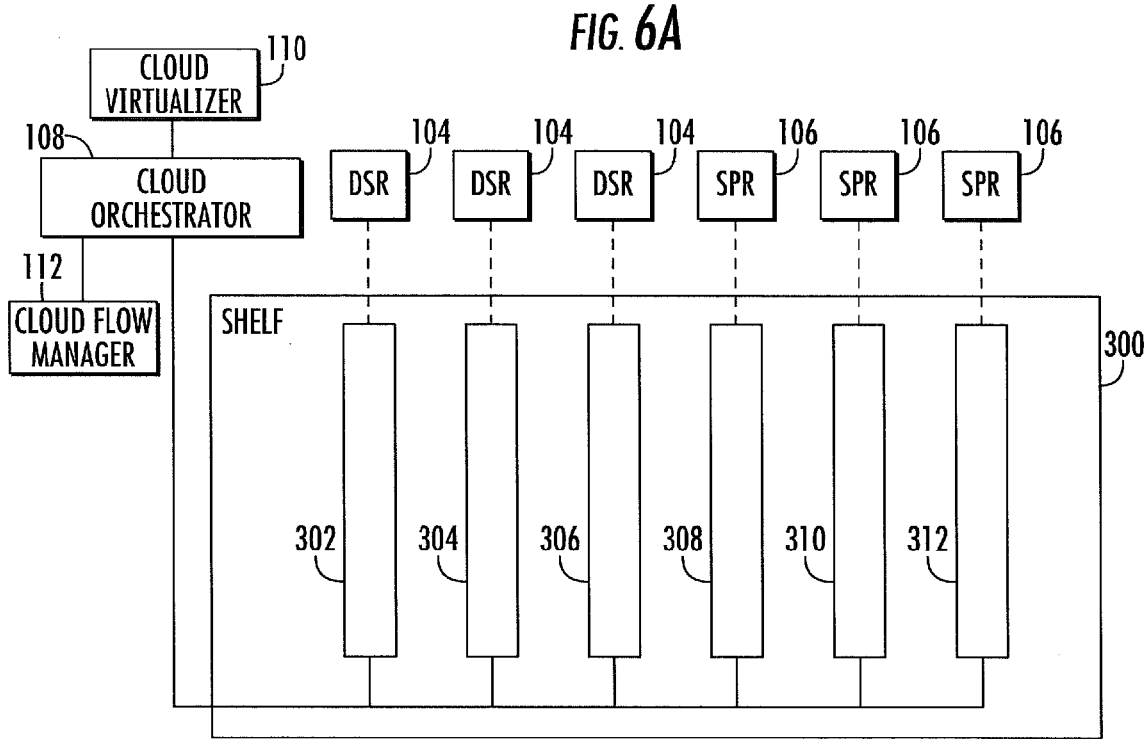

In yet another example, hardware resources previously allocated to DSR resource instances may be allocated to SPR resource instances. FIGS. 6A and 6B illustrate this example. In FIG. 6A, processor blades 302, 304, 306, and 308 are allocated to DSR resource instances, and processor blades 310 and 312 are allocated to SPR resource instances. If cloud orchestrator 110 detects that processor blades supporting SPR resource instances 106 are overloaded and processor blades supporting DSR resource instances have additional capacity, cloud orchestrator 110 may instruct cloud virtualizer 108 to reallocate a processor blade previously allocated to a DSR resource instance to an SPR resource instance.

FIG. 6B illustrates the state of the system after such dynamic reallocation. In FIG. 6B, processor blade 308 is allocated to an SPR resource instance 106, rather than a DSR resource instance 104. Once processor blade 308 is assigned to an SPR resource instance 106, cloud flow manager 112 may instruct switches and routers to route SPR traffic to processor blade 308 and to load share DSR traffic formerly handled by processor blade 308 among processor blades 302, 304, and 306.

Figure 7A:
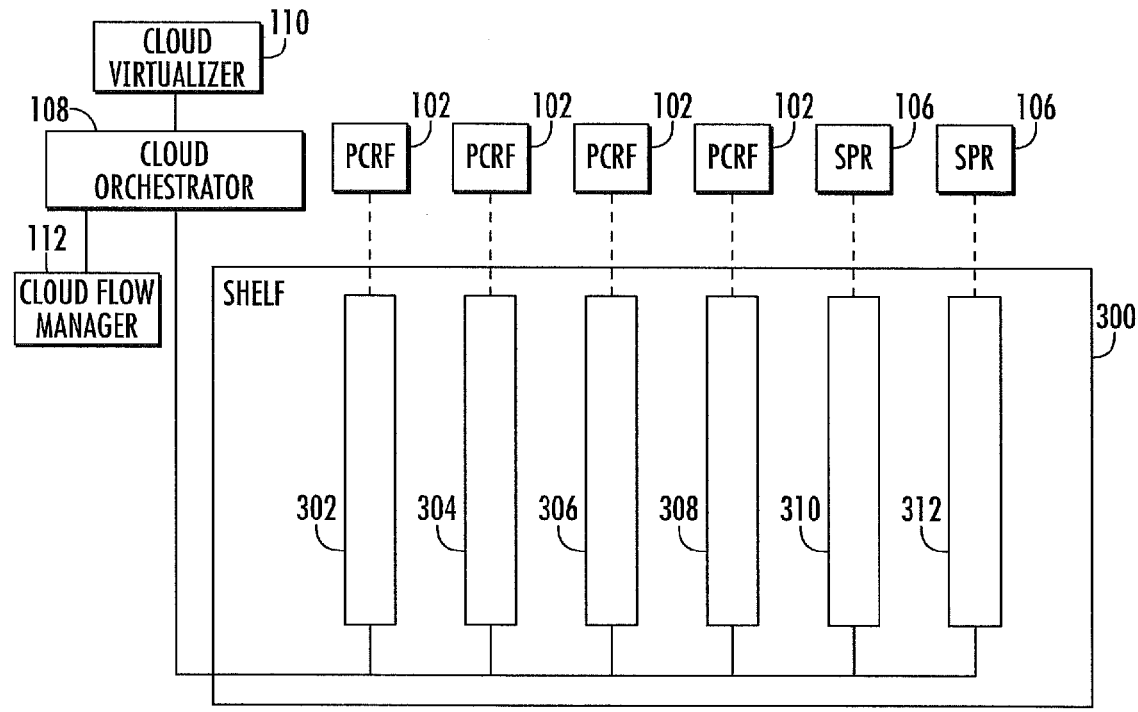
FIGS. 7A and 7B are block diagrams illustrating dynamic reallocation of hardware from PCRF resource instances to SPR resource instances according to an embodiment of the subject matter described herein.
Figure 7B:
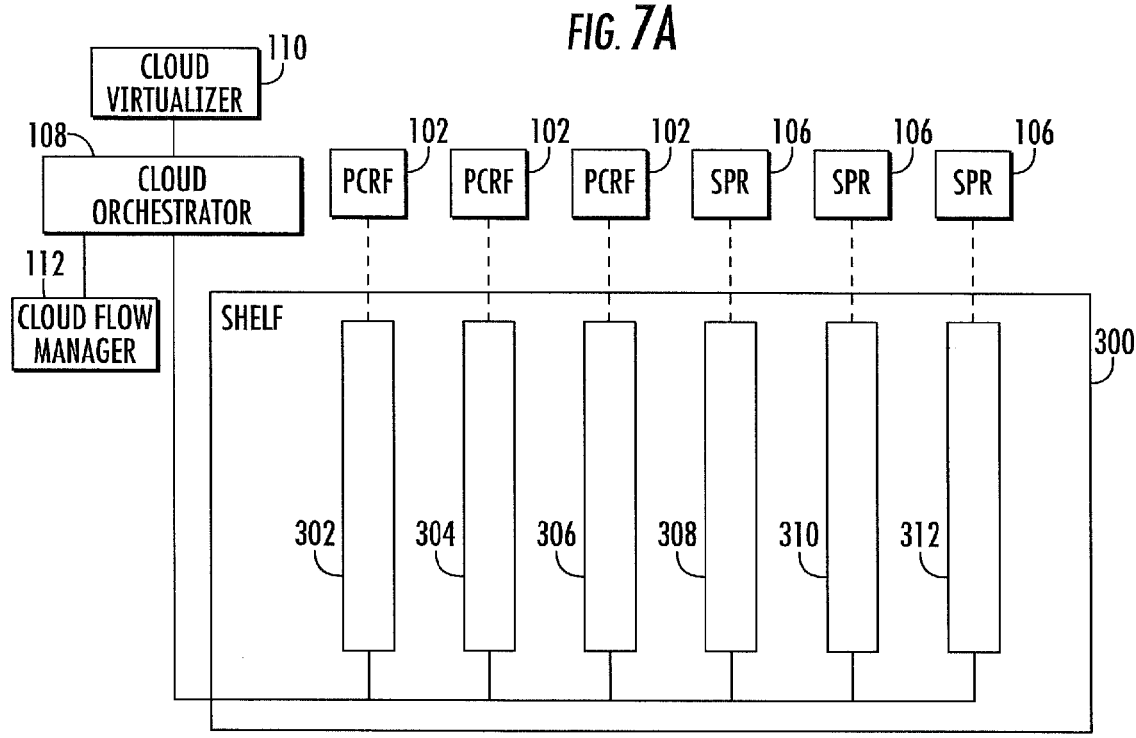

In yet another example, hardware previously allocated to PCRF resource instances may be dynamically allocated to SPR resource instances. FIGS. 7A and 7B illustrate this example. Referring to FIG. 7A, processor blades 302, 304, 306, and 308 are allocated to PCRF resource instances 102. Processor blades 310 and 312 are allocated to SPR resource instances 106. If cloud orchestrator 110 detects that processor blades allocated to SPR resource instances 106 are overloaded and processor blades allocated to PCRF resource instances 102 have additional capacity, cloud orchestrator 110 may instruct cloud virtualizer 108 to reallocate hardware to SPR resource instances.

FIG. 7B illustrates the state from the system of 7A after such reallocation. In FIG. 7B, a new SPR resource instance has been instantiated and the new SPR resource instance is assigned SPR resource instance 106. Once processor blade 308 is allocated SPR resource instance 106, cloud flow manager 112 may instruct switches and routers to direct SPR traffic to processor blade 308 and to load share PCRF traffic formerly handled by processor blade 308 among processor blades 302, 304, and 306.

Figure 8A:
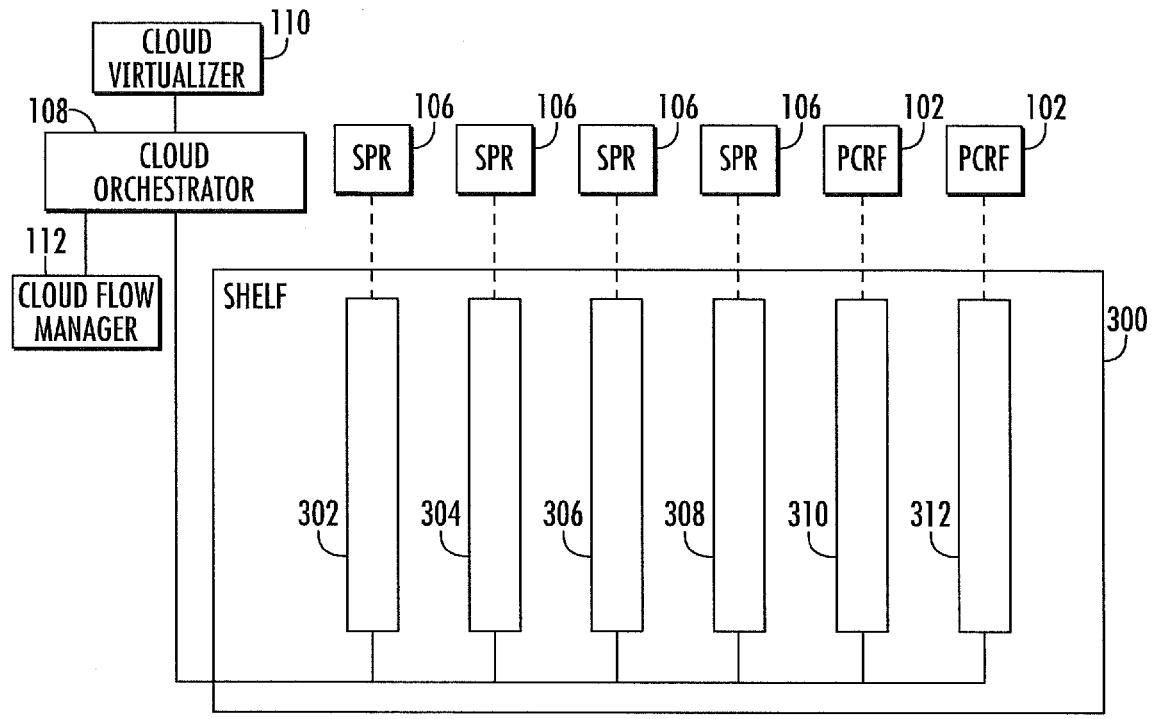
FIGS. 8A and 8B are block diagrams illustrating dynamic reallocation of hardware from SPR resource instances to PCRF resource instances according to an embodiment of the subject matter described herein.
Figure 8B:
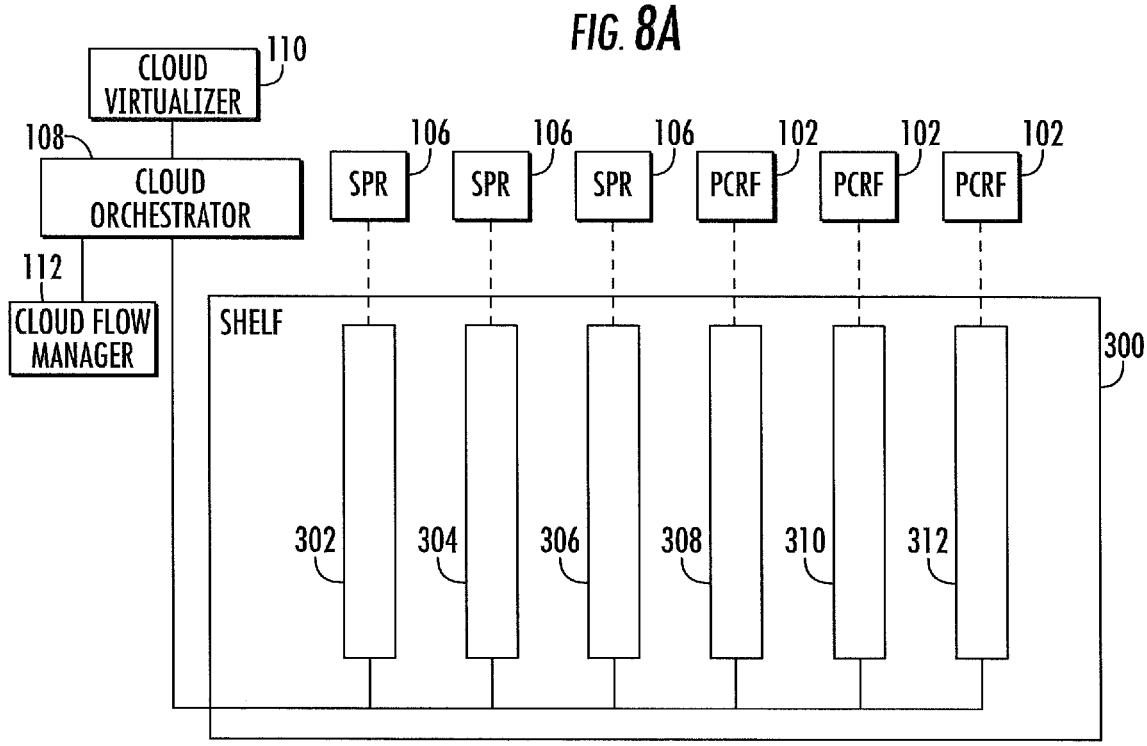

In yet another example, hardware resources previously assigned to an SPR resource instance may be reallocated to a PCRF resource instance. FIGS. 8A and 8B illustrate such an example. Referring to FIG. 8A, processor blades 302, 304, 306, and 308 are dynamically allocated to SPR resource instances 106. Processor blades 310 and 312 are assigned to PCRF resource instances 102. If cloud orchestrator 110 determines that the hardware supporting PCRF resource instances 102 is overloaded and the hardware supporting SPR resource instances 106 is underutilized, cloud orchestrator 110 may instruct cloud virtualizer 108 to reallocate one or more processor blades to the PCRF resource instances. In the illustrated example, cloud orchestrator 110 instructs cloud virtualizer 108 to allocate hardware blade 308 to a PCRF resource instance 102. FIG. 8B illustrates the state of the system after such dynamic reallocation. In FIG. 8B, processor blade 308 which was previously allocated to an SPR resource instance is now reallocated to a newly instantiated PCRF resource instance 102. Once processor blade 308 is assigned to a PCRF resource instance 102, cloud flow manager 112 may instruct switches and routers to route PCRF traffic to processor blade 308 and to load share SPR traffic formerly handled by processor blade 308 among processor blades 302, 304, and 306.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing virtualized Diameter resources and for routing traffic to dynamically instantiated Diameter instances or newly allocated hardware, the system comprising:
   a cloud virtualizer for virtualizing a hardware pool and for supporting dynamically instantiated Diameter resource instances;
   a cloud orchestrator for monitoring network and hardware events and for instructing the cloud virtualizer to dynamically instantiate Diameter resource instances or to allocate hardware from the hardware pool among instantiated Diameter resource instances in response to the network or hardware conditions; and
   a cloud flow manager for dynamically configuring at least one network element for routing traffic to the dynamically instantiated Diameter resource instances or to the allocated hardware.

2. The system of claim 1 wherein the Diameter resource instances include Diameter signaling router (DSR) resource instances, policy and charging rules function (PCRF) resource instances, and subscriber profile repository (SPR) resources instances.

3. The system of claim 1 wherein the cloud orchestrator is configured to instruct the cloud virtualizer to dynamically reallocate hardware allocated to a Diameter resource instance of a first type to a Diameter resource instance of a second type in response to the network or hardware conditions.

4. The system of claim 3 wherein the Diameter resource instance of the first type comprises a policy and charging rules function (PCRF) resource instance and wherein the Diameter resource of the second type includes a Diameter signaling router (DSR) resource instance.

5. The system of claim 3 wherein the Diameter resource instance of the first type comprises a Diameter signaling router (DSR) resource instance and wherein the Diameter resource of the second type includes a policy and charging rules function (PCRF) resource instance.

6. The system of claim 3 wherein the Diameter resource instance of the first type comprises a subscriber profile repository (SPR) resource instance and wherein the Diameter resource of the second type includes a Diameter signaling router (DSR) resource instance.

7. The system of claim 3 wherein the Diameter resource instance of the first type comprises a Diameter signaling router (DSR) resource instance and wherein the Diameter resource of the second type includes a subscriber profile repository (SPR) resource instance.

8. The system of claim 3 wherein the Diameter resource instance of the first type comprises a policy and charging rules function (PCRF) resource instance and wherein the Diameter resource of the second type includes a subscriber profile repository (SPR) resource instance.

9. The system of claim 3 wherein the Diameter resource instance of the first type comprises a subscriber profile repository (SPR) resource instance and wherein the Diameter resource of the second type includes a policy and charging rules function (PCRF) resource instance.

10. The system of claim 1 wherein cloud flow manager uses software defined network (SDN) commands to dynamically reconfigure network elements to route traffic to the dynamically instantiated Diameter resource instances.

11. A method for providing virtualized Diameter resources and for routing traffic to dynamically instantiated Diameter resources, the method comprising:
   virtualizing a hardware pool for supporting dynamically instantiated Diameter resource instances;
   monitoring network and hardware events in a Diameter network and instantiating Diameter resource instances or allocating hardware from the hardware pool in response to the network or hardware conditions; and
   dynamically routing traffic to the dynamically instantiated Diameter resource instances or to the allocated hardware.

12. The method of claim 11 wherein the Diameter resource instances include Diameter signaling router (DSR) resource instances, policy and charging rules function (PCRF) resource instances, and subscriber profile repository (SPR) resources instances.

13. The method of claim 11 wherein instantiating Diameter resource instances or allocating hardware from the hardware pool includes reallocating hardware allocated to a Diameter resource instance of a first type to a Diameter resource instance of a second type in response to the network or hardware conditions.

14. The method of claim 13 wherein the Diameter resource instance of the first type comprises a policy and charging rules function (PCRF) resource instance and wherein the Diameter resource of the second type includes a Diameter signaling router (DSR) resource instance.

15. The method of claim 13 wherein the Diameter resource instance of the first type comprises a Diameter signaling router (DSR) resource instance and wherein the Diameter resource of the second type includes a policy and charging rules function (PCRF) resource instance.

16. The method of claim 13 wherein the Diameter resource instance of the first type comprises a subscriber profile repository (SPR) resource instance and wherein the Diameter resource of the second type includes a Diameter signaling router (DSR) resource instance.

17. The method of claim 13 wherein the Diameter resource instance of the first type comprises a Diameter signaling router (DSR) resource instance and wherein the Diameter resource of the second type includes a subscriber profile repository (SPR) resource instance.

18. The method of claim 13 wherein the Diameter resource instance of the first type comprises a policy and charging rules function (PCRF) resource instance and wherein the Diameter resource of the second type includes a subscriber profile repository (SPR) resource instance.

19. The method of claim 11 wherein dynamically configuring at least one network element for routing traffic to the dynamically instantiated resource instances includes issuing software defined network (SDN) commands to the at least one network element.

20. A non-transitory computer readable medium having stored thereon executable instructions that when executed by the processor of a computer control the computer to perform steps comprising:
   virtualizing a hardware pool for supporting dynamically instantiated Diameter resource instances;
   monitoring network and hardware events in a Diameter network and instantiating Diameter resource instances or allocating hardware from the hardware pool in response to the network or hardware conditions; and
   dynamically routing traffic to the dynamically instantiated Diameter resource instances or to the allocated hardware.

* * * * *